United States Patent
Ohachi et al.

(10) Patent No.: US 10,668,895 B2
(45) Date of Patent: Jun. 2, 2020

(54) VARIABLE FORCE LIMITER CONTROL SYSTEM FOR VEHICLE

(71) Applicant: TOYOTA JIDOSHA KABUSHIKI KAISHA, Aichi-ken (JP)

(72) Inventors: Jiro Ohachi, Shizuoka-ken (JP); Takuya Nezaki, Mizunami (JP); Takashi Hasegawa, Kanagawa-ken (JP); Katsunori Yamada, Toyota (JP); Mitsuaki Gotoh, Nagoya (JP); Makoto Aki, Toyota (JP); Yusuke Mase, Nagoya (JP); Takashi Fujinami, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 26 days.

(21) Appl. No.: 15/890,158

(22) Filed: Feb. 6, 2018

(65) Prior Publication Data

US 2018/0236971 A1    Aug. 23, 2018

(30) Foreign Application Priority Data

Feb. 17, 2017  (JP) .................. 2017-028337

(51) Int. Cl.
*B60R 22/48* (2006.01)
*B60R 22/28* (2006.01)
*B60R 21/0132* (2006.01)
*B60R 21/203* (2006.01)
*B60R 21/01* (2006.01)

(52) U.S. Cl.
CPC ............. *B60R 22/48* (2013.01); *B60R 22/28* (2013.01); *B60R 21/0132* (2013.01); *B60R 21/203* (2013.01); *B60R 2021/01231* (2013.01); *B60R 2021/01279* (2013.01);
(Continued)

(58) Field of Classification Search
CPC ...................................... B60R 22/48
See application file for complete search history.

(56) References Cited

U.S. PATENT DOCUMENTS

2004/0216939 A1\* 11/2004 Lorenz ................ B60R 21/015
                                                    180/268
2006/0192370 A1    8/2006 Abe et al.
(Continued)

FOREIGN PATENT DOCUMENTS

EP         1695878 A1    8/2006
JP       2004-521014 A    7/2004
(Continued)

*Primary Examiner* — Joseph T Phan
(74) *Attorney, Agent, or Firm* — Hauptman Ham, LLP

(57) ABSTRACT

A variable force limiter control system for a vehicle includes a variable force limiter mechanism, a relative speed sensor, an acceleration sensor and an electronic control unit. The variable force limiter mechanism is configured to change a force limiter load. The relative speed sensor is configured to detect a relative speed of the vehicle with respect to a collision object before a collision. The acceleration sensor is configured to detect an acceleration of the vehicle. The electronic control unit is configured to predict a severity of a collision on the basis of at least the relative speed. The electronic control unit is configured to control the force limiter load on the basis of both the predicted severity and the acceleration in an initial stage of the collision of the vehicle.

5 Claims, 11 Drawing Sheets

(52) U.S. Cl.
CPC ........... *B60R 2021/01286* (2013.01); *B60R 2022/288* (2013.01); *B60R 2022/4841* (2013.01)

(56) References Cited

U.S. PATENT DOCUMENTS

| | | | |
|---|---|---|---|
| 2006/0237572 A1* | 10/2006 | Hiramatsu | ......... B60R 22/3413 |
| | | | 242/379.1 |
| 2008/0099594 A1* | 5/2008 | Hiramatsu | ......... B60R 22/3413 |
| | | | 242/379.1 |
| 2012/0175451 A1 | 7/2012 | Yanagawa et al. | |
| 2012/0318904 A1 | 12/2012 | Ukita et al. | |

FOREIGN PATENT DOCUMENTS

| | | | |
|---|---|---|---|
| JP | 2006-062632 | A | 3/2006 |
| JP | 2006-264672 | A | 10/2006 |
| JP | 2006-306142 | A | 11/2006 |
| JP | 2008-507445 | A | 3/2008 |
| JP | 2008-114659 | A | 5/2008 |
| JP | 2012-144123 | A | 8/2012 |
| JP | 2013-001313 | A | 1/2013 |
| JP | 2013-103603 | A | 5/2013 |
| JP | 2013-249030 | A | 12/2013 |
| WO | 2006/009500 | A1 | 1/2006 |

\* cited by examiner

VARIABLE FORCE LIMITER CONTROL SYSTEM FOR VEHICLE

INCORPORATION BY REFERENCE

The disclosure of Japanese Patent Application No. 2017-028337 filed on Feb. 17, 2017 including the specification, drawings and abstract is incorporated herein by reference in its entirety.

BACKGROUND

1. Technical Field

The disclosure relates to a variable force limiter control system for a vehicle.

2. Description of Related Art

Japanese Patent Application Publication No. 2006-62632 (JP 2006-062632 A) describes a seatbelt retractor. The seatbelt retractor includes at least first and second seatbelt load limiting mechanisms (force limiter mechanisms), and is able to change a limit load (force limiter load) that acts on a seatbelt in three levels in the event of a collision. The second seatbelt load limiting mechanism changes a force limiter load on the basis of information that is acquired in advance (the weight of an occupant, a seat slide position, and the like), collision prediction information that a collision has been predicted by a collision prediction sensor, and information about the severity of a collision after the collision (collision speed, collision acceleration/deceleration, the manner of a collision, and the like). Thus, various force limiter loads are set further flexibly in response to a situation in the event of a collision.

SUMMARY

However, the thus configured seatbelt retractor is configured to determine the severity of a collision after the collision on the basis of a detected signal of an acceleration sensor. In this case, unless acceleration in a period from the beginning of the collision to the end of the collision is integrated, it is not possible to accurately obtain the severity of the collision. That is, since it is not possible to accurately determine the severity of the collision until the end of the collision, it is difficult to switch the force limiter load at appropriate timing. If it is intended to switch the force limiter load at appropriate timing, the force limiter load is changed at timing at which the severity of the collision has not been accurately determined, so this causes erroneous switching of the force limiter load (an unnecessary operation of the force limiter mechanism).

The disclosure provides a variable force limiter control system for a vehicle, which is able to, when a force limiter load mode is switched in response to the severity of a collision, switch the force limiter load mode at appropriate timing and which is able to prevent or reduce erroneous switching of the force limiter load mode.

An aspect of the disclosure provides a variable force limiter control system for a vehicle. The variable force limiter control system includes: a variable force limiter mechanism configured to change a force limiter load that acts on a seatbelt in an event of a collision of the vehicle; a relative speed sensor configured to detect a relative speed between the vehicle and a collision object before the collision; an acceleration sensor configured to detect an acceleration of the vehicle; and an electronic control unit configured to predict a severity of the collision based on at least the relative speed and control the force limiter load at least based on the predicted severity and the acceleration in an initial stage of the collision. In the above aspect, the variable force limiter mechanism may be configured to switch a mode of the force limiter load from a high-load mode to a low-load mode, and the electronic control unit may be configured to control switching of the mode of the force limiter load.

In the above aspect, the initial stage of a collision may be a period after the beginning of the collision and is a period before the force limiter load reaches a load in the low-load mode.

According to the above aspect, the variable force limiter mechanism is able to switch the mode of the force limiter load, which acts on the seatbelt in the event of a collision of the vehicle, from the high-load mode to the low-load mode. The relative speed sensor detects the relative speed of the vehicle with respect to the collision object before a collision, and the acceleration sensor detects the acceleration of the vehicle. The electronic control unit predicts the severity of a collision on the basis of at least the relative speed detected by the relative speed sensor, and controls switching of the mode of the force limiter load on the basis of both the predicted severity and the acceleration detected by the acceleration sensor in the initial stage of the collision of the vehicle. Thus, for example, in comparison with the case where the electronic control unit controls switching of the mode on the basis of either one of the predicted severity and the detected acceleration, the electronic control unit is able to accurately determine the necessity of switching of the mode, so it is possible to prevent or reduce erroneous switching. In addition, the acceleration detected by the acceleration sensor in the initial stage of a collision of the vehicle is used, so it is possible to switch the mode of the force limiter load at appropriate timing.

In the above aspect, the variable force limiter control system may further include a type detection sensor configured to detect a type of the collision object. The electronic control unit may be configured to estimate a mass of the collision object based on the type of the collision object, and predict the severity of the collision based on at least the estimated mass and the relative speed.

In the above configuration, the electronic control unit estimates the mass of the collision object on the basis of the type (size, model, and the like) of the collision object, detected by the type detection sensor, and predicts the severity of a collision on the basis of both the estimated mass and the relative speed detected by the relative speed sensor. Thus, it is possible to increase the accuracy of prediction.

In the above aspect, the variable force limiter control system may further include a build sensor configured to detect a build of an occupant wearing the seatbelt. The electronic control unit may be configured to predict a maximum forward stroke of the occupant with respect to the vehicle in the event of a collision in a case where the mode of the force limiter load is the low-load mode based on at least the build of the occupant and the predicted severity, and the electronic control unit may be configured to, when it is determined that there is a possibility that the occupant collides with a vehicle interior component located forward of the occupant, keep the mode of the force limiter load in the high-load mode.

In the above configuration, the electronic control unit predicts the maximum forward stroke of the occupant with respect to the vehicle in the event of a collision in the case where the mode of the force limiter load is the low-load mode on the basis of both the build of the occupant, detected by the build sensor, and the severity of the collision, predicted by the electronic control unit. As a result, when the electronic control unit determines that there is a possibility that the occupant collides with a vehicle interior component (steering wheel, or the like) located forward of the occupant, the electronic control unit keeps the mode of the force limiter load in the high-load mode. Thus, it is possible to prevent a collision of the occupant with the vehicle interior component. An airbag that inflates and deploys from the steering wheel, or the like, in the event of a collision of the vehicle is not included in the vehicle interior component described in the above aspect.

In the above aspect, the electronic control unit may be configured to, when the relative speed is higher than or equal to a preset speed, keep the mode of the force limiter load in the high-load mode.

In the above configuration, when the relative speed detected by the relative speed sensor, that is, the relative speed of the vehicle with respect to the collision object, is higher than or equal to a preset speed (in the event of a high-speed collision), the electronic control unit keeps the mode of the force limiter load in the high-load mode. That is, if the mode of the force limiter load is switched to the low-load mode in the event of a high-speed collision, the risk that the occupant collides with a forward vehicle interior component increases. However, in the aspect of the disclosure, since the mode of the force limiter load is kept in the high-load mode, it is possible to avoid the above risk.

As described above, with the variable force limiter control system according to the aspect of the disclosure, in switching the mode of the force limiter load in response to the severity of a collision, it is possible to switch the mode at appropriate timing and prevent or reduce erroneous switching of the mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a variable force limiter control system 10 for a vehicle according to a first embodiment of the disclosure will be described with reference to FIG. 1 to FIG. 13. The arrow FR and the arrow UP shown in FIG. 1 respectively indicate the forward and upward sides of a vehicle (automobile) V1 to which the variable force limiter control system 10 for a vehicle is applied.

Figure 1:
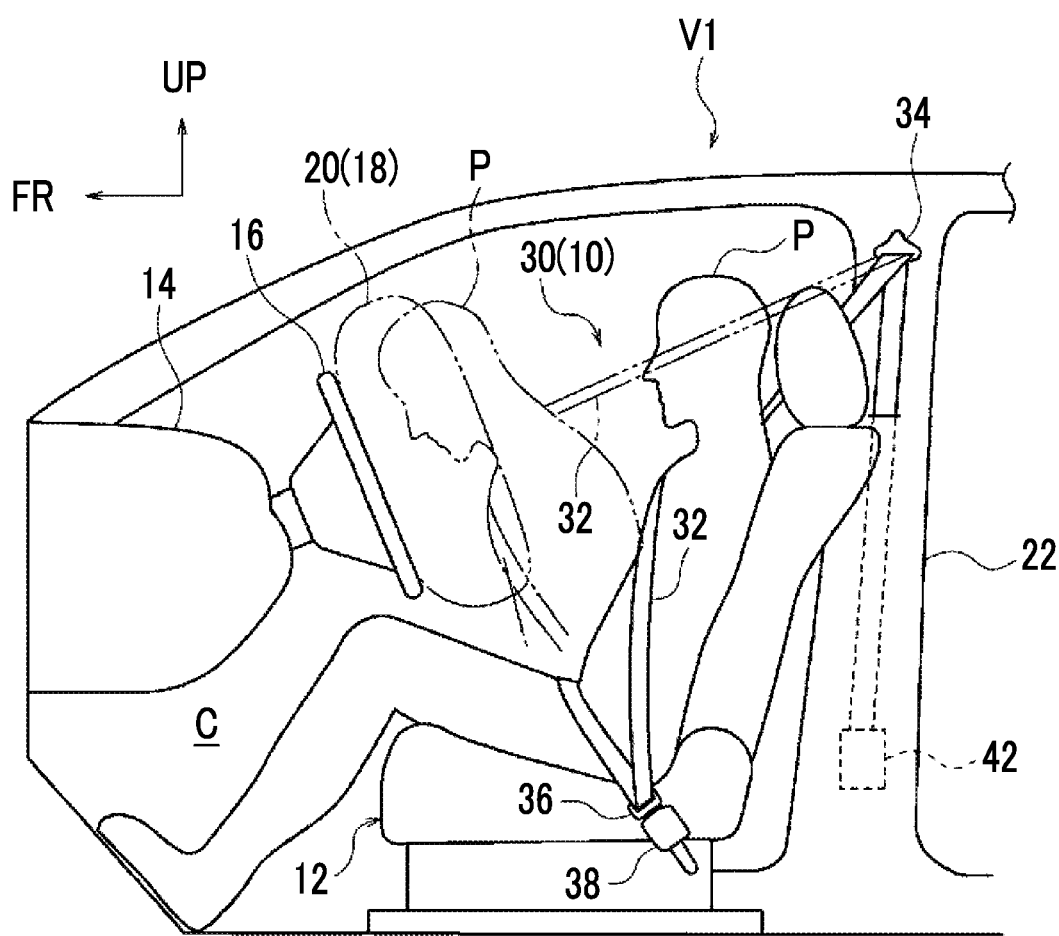
FIG. 1 is a side view when the front part of a cabin of a vehicle to which a variable force limiter control system for a vehicle according to a first embodiment of the disclosure is applied is viewed from a vehicle left side.
Figure 2:
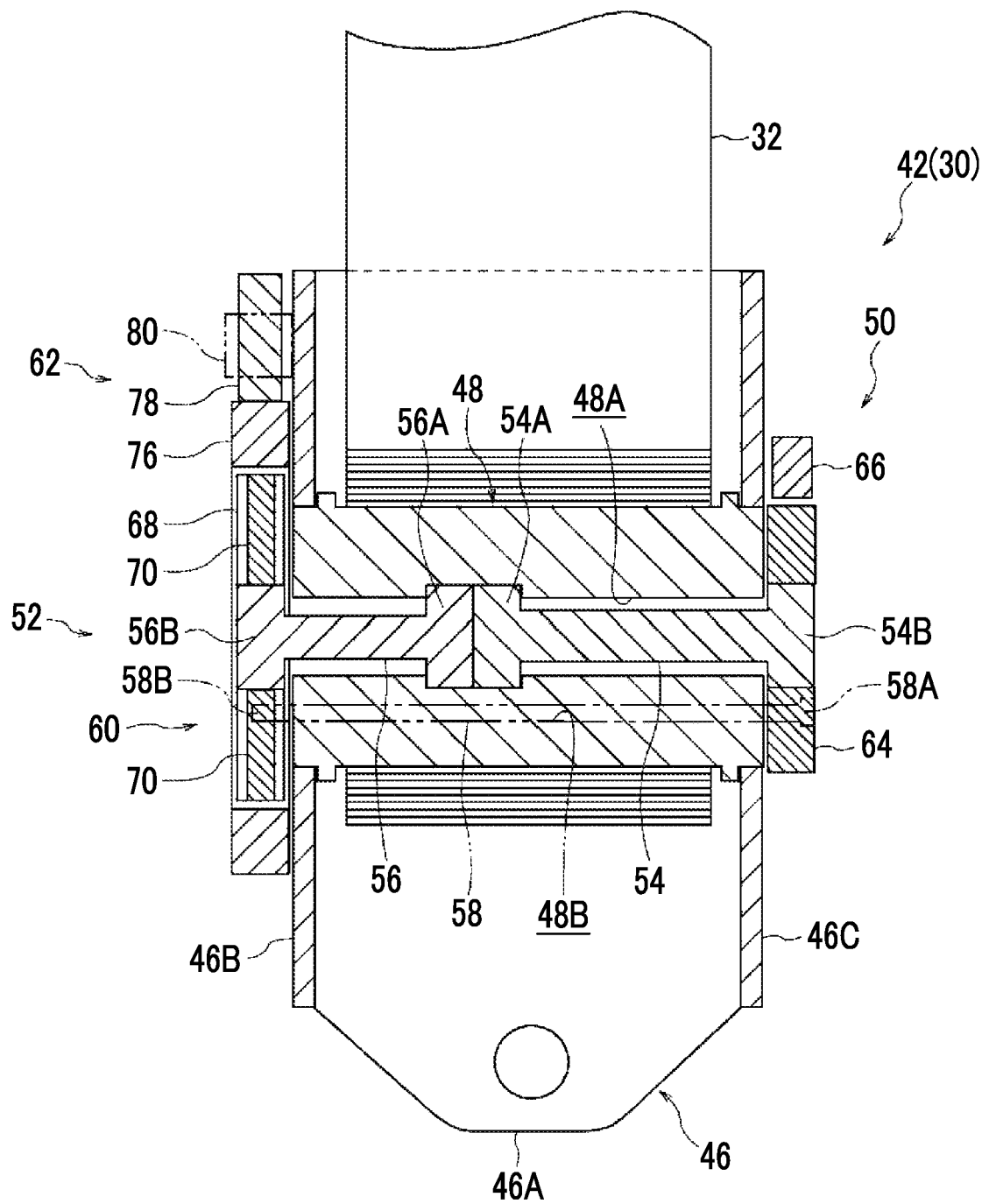
FIG. 2 is a cross-sectional view of a seatbelt retractor that is a component of the variable force limiter control system for a vehicle according to the first embodiment of the disclosure.

FIG. 1 is a side view of the front part of a cabin C in the vehicle V1 to which the variable force limiter control system 10 for a vehicle is applied. The vehicle V1 includes a vehicle seat 12 (here, driver seat) on which an occupant P is seated. Vehicle interior components, such as an instrument panel 14 and a steering wheel 16, are provided forward of the vehicle seat 12. The steering wheel 16 is equipped with a driver seat airbag device 18. The driver seat airbag device 18 is configured to inflate and deploy an airbag 20 by activating a gas generating device at the time when a frontal collision of the vehicle has been detected. The variable force limiter control system 10 for a vehicle, applied to the vehicle V1, includes a seatbelt device 30 for a driver seat and a control unit 90 shown in FIG. 8.

Configuration of Seatbelt Device 30

As shown in FIG. 1, the seatbelt device 30 is a three-point seatbelt device, and includes a seatbelt (webbing) 32. One end of the seatbelt 32 in the longitudinal direction is anchored to a spool 48 (see FIG. 2) of a seatbelt retractor 42 fixed to the lower end of a B-pillar 22. The middle portion of the seatbelt 32 in the longitudinal direction is wound on a shoulder anchor (slip joint) 34 installed at the upper portion of the B-pillar 22. The other end of the seatbelt 32 in the longitudinal direction is anchored to an anchor member (not shown) fixed to the floor of the vehicle V1 near the lower end of the B-pillar 22.

A tongue plate 36 is slidably provided at the middle portion of the seatbelt 32 in the longitudinal direction between the shoulder anchor 34 and the anchor member. The tongue plate 36 is coupled to a buckle 38 provided at the center side of the vehicle seat 12 in the vehicle width direction. Thus, the occupant P seated on the vehicle seat 12 wears the seatbelt 32 (the occupant P is restrained to the vehicle seat 12 by the seatbelt 32).

The seatbelt retractor 42 (hereinafter, simply referred to as retractor 42) is a take-up device that takes the seatbelt 32 and stores the seatbelt 32. The retractor 42 includes a frame 46, the spool (take-up shaft) 48, a lock mechanism 50, a variable force limiter mechanism 52, and a pretensioner mechanism (not shown). The variable force limiter mechanism 52 (hereinafter, simply referred to as variable FL mechanism 52) includes a main torsion shaft 54, a sub-torsion shaft 56, a trigger wire 58, a clutch mechanism 60 and a switching mechanism 62. The pretensioner mechanism is of, for example, an explosive type. The pretensioner mechanism is configured to forcibly take up the seatbelt 32 on the spool 48 by a predetermined amount by rotating the spool 48 as a result of ignition of explosive at the time when a frontal collision of the vehicle V1 has been detected.

Figure 3:
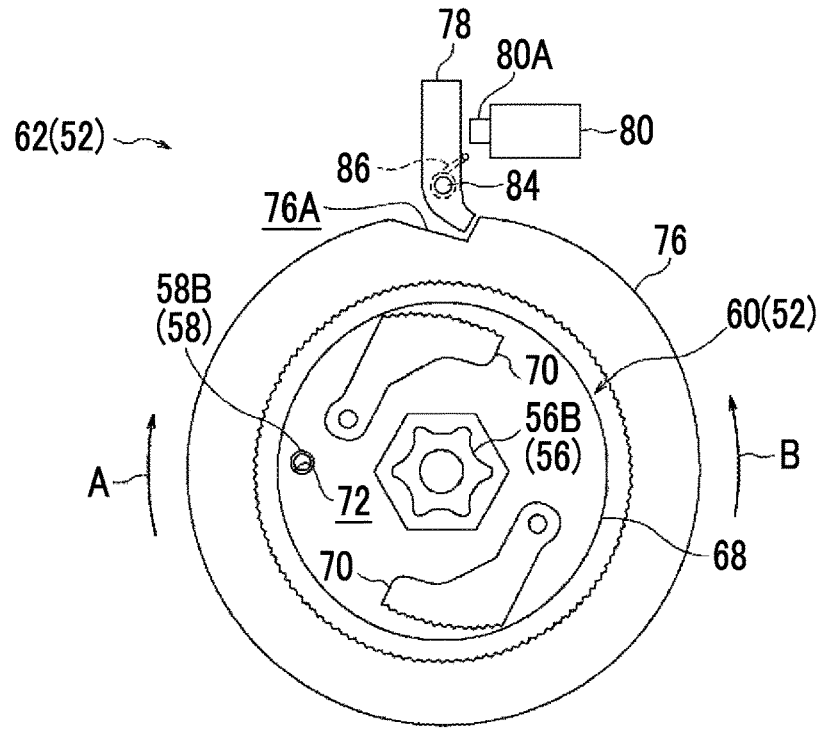
FIG. 3 is a front view that shows the configurations of a clutch mechanism and switching mechanism of a variable force limiter mechanism provided in the seatbelt retractor, and is a view that shows a non-operated state of the clutch mechanism.
Figure 4:
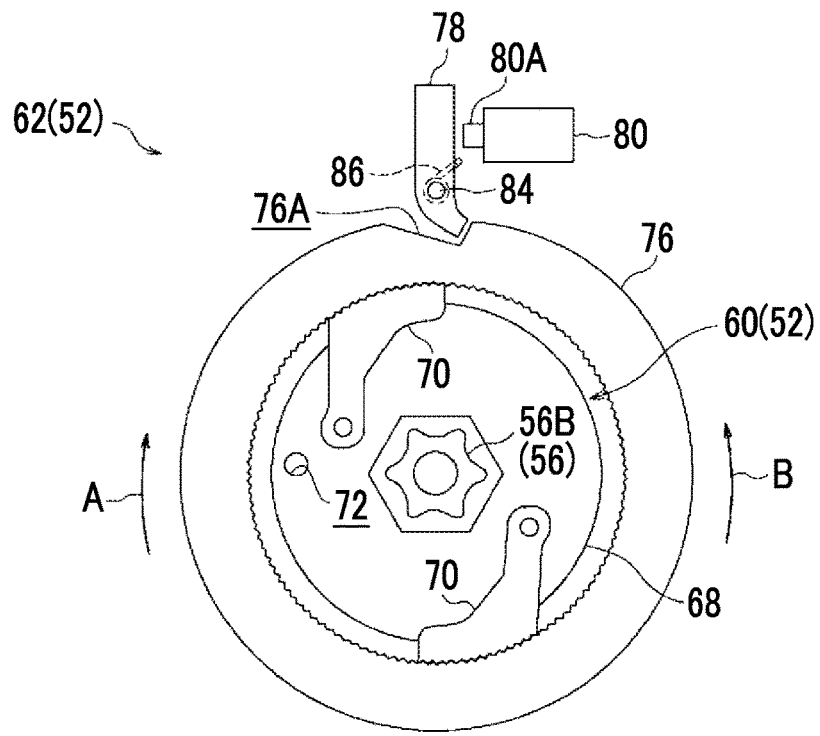
FIG. 4 is a view that shows an operated state of the clutch mechanism and that corresponds to FIG. 3.
Figure 5:
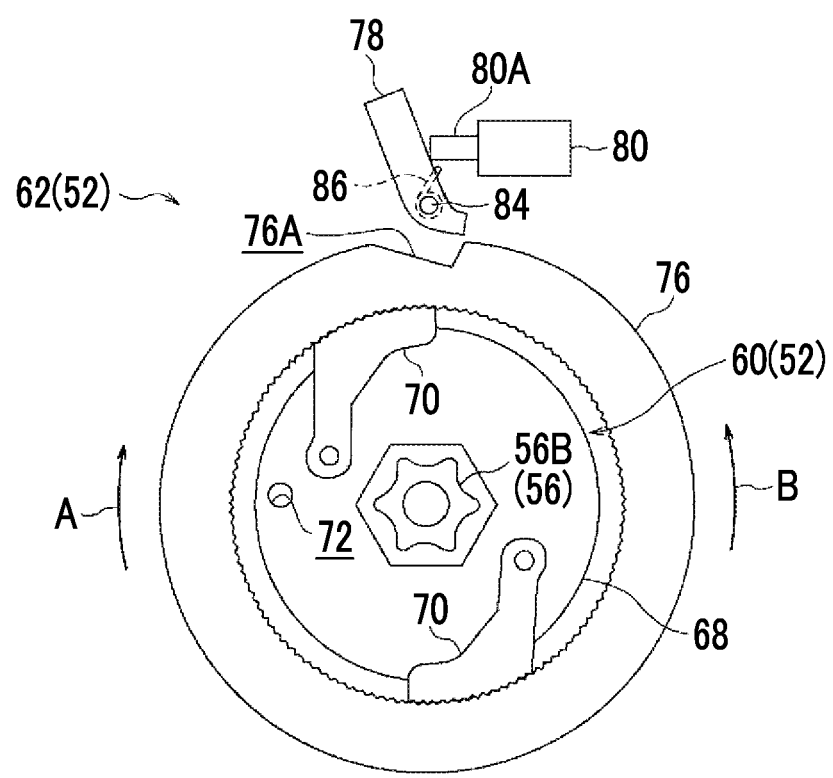
FIG. 5 is a view that shows a state where a gas generator of the switching mechanism has been activated and that corresponds to FIG. 4.

The frame 46 includes a plate-shaped back board 46A fixed to a vehicle body. Leg pieces 46B, 46C respectively extend at substantially right angles from both ends of the back board 46A in the width direction. The frame 46 is formed in a substantially U-shape in plan view. The spool 48 is formed in a cylindrical shape with a through-hole 48A that extends through in an axial direction. The spool 48 is arranged between the leg piece 46B and the leg piece 46C in such a manner that the axial direction is set in a direction in which the leg piece 46B and the leg piece 46C face each other. The spool 48 is rotatably supported on the frame 46 via the main torsion shaft 54, the sub-torsion shaft 56, and the like. As described above, one end of the seatbelt 32 in the longitudinal direction is anchored to the spool 48. The spool 48 is configured to take up and store the seatbelt 32 from one end side in the longitudinal direction by rotating in a belt take-up direction that is one rotation direction. The spool 48 is configured to be rotated in a belt drawing direction that is the other rotation direction when the seatbelt 32 is drawn. The direction indicated by the arrow A in FIG. 3 to FIG. 5 is the belt take-up direction, and the direction indicated by the arrow B in FIG. 3 to FIG. 5 is the belt drawing direction.

The lock mechanism 50 includes a lock gear 64 and a lock pawl 66. The lock gear 64 is arranged coaxially with the spool 48 on one side (right side in FIG. 2) of the spool 48 in the axial direction. The lock pawl 66 is meshable with the lock gear 64. When the lock mechanism 50 detects that the acceleration (particularly, deceleration) of the vehicle V1 is higher than or equal to a certain value or the drawing acceleration of the seatbelt 32 from the spool 48 is higher than or equal to a certain value, the lock pawl 66 is engaged with the lock gear 64. Thus, the lock gear 64 is blocked (locked) from rotating in the belt drawing direction.

The main torsion shaft 54 is coaxially inserted in the through-hole 48A of the spool 48. One end 54A of the main torsion shaft 54 in the axial direction is fitted and anchored to the middle portion in the axial direction in the inner peripheral portion of the spool 48. Thus, the main torsion shaft 54 is coupled to the spool 48 so as to be integrally rotatable with the spool 48. The other end 54B of the main torsion shaft 54 in the axial direction is fitted and anchored to the axis portion of the lock gear 64. Thus, the main torsion shaft 54 is coupled to the lock gear 64 so as to be integrally rotatable.

The main torsion shaft 54 torsionally deforms as the seatbelt 32 is pulled by an occupant with excessive load in a state where rotation of the lock gear 64 in the belt drawing direction is locked as a result of a collision of the vehicle V1. That is, as the rotational force of the spool 48 in the belt drawing direction based on the pulling force of the seatbelt 32 exceeds a bearing torsional load (bearing deformation load) of the main torsion shaft 54, the main torsion shaft 54 torsionally deforms (the variable FL mechanism 52 operates). Thus, by the torsional deformation of the main torsion shaft 54, the spool 48 rotates in the drawing direction, and the seatbelt 32 is allowed to be drawn from the retractor 42. At this time, a load that is applied for the above torsional deformation acts on the seatbelt 32 as a force limiter load (hereinafter, referred to as FL load).

The sub-torsion shaft 56 is coaxially inserted in the through-hole 48A of the spool 48 on the other side of the spool 48 in the axial direction with respect to the main torsion shaft 54. One end 56A of the sub-torsion shaft 56 in the axial direction is fitted and anchored to the middle portion in the axial direction in the inner peripheral portion of the spool 48. Thus, the sub-torsion shaft 56 is coupled to the spool 48 so as to be integrally rotatable with the spool 48. The other end 56B of the sub-torsion shaft 56 in the axial direction protrudes toward the other side (left side in FIG. 2) of the spool 48 in the axial direction. The other end 56B of the sub-torsion shaft 56 in the axial direction is located near the clutch mechanism 60.

The trigger wire 58 is inserted in a hole 48B provided in the spool 48 in parallel with the through-hole 48A of the spool 48. One end 58A of the trigger wire 58 is anchored to the lock gear 64. The other end 58B of the trigger wire 58 protrudes toward the other side (left side in FIG. 2) of the spool 48 in the axial direction. The other end 58B of the trigger wire 58 is located near the clutch mechanism 60.

The clutch mechanism 60 includes a clutch base portion 68 and a pair of pawls 70. The clutch base portion 68 is arranged coaxially with the spool 48 at the other side of the spool 48 in the axial direction. The pair of pawls 70 are pivotally supported by the clutch base portion 68. The other end 56B of the sub-torsion shaft 56 in the axial direction is fitted and anchored to the axis portion of the clutch base portion 68. Thus, the sub-torsion shaft 56 is coupled to the clutch base portion 68 so as to be integrally rotatable with the clutch base portion 68.

The clutch base portion 68 has a wire insertion hole 72 in which the other end 58B of the trigger wire 58 is inserted. In the above inserted state, the pair of pawls 70 are held in a non-operated position shown in FIG. 3. As the spool 48 rotates in the belt drawing direction with respect to the lock gear 64 as a result of torsional deformation of the main torsion shaft 54, the trigger wire 58 is pulled out from the wire insertion hole 72. Thus, the pair of pawls 70 are pivoted to an operated position shown in FIG. 4 and FIG. 5 under the urging force of an urging member (not shown), and are engaged with a lock ring 76 of the switching mechanism 62. In this engaged state, the lock ring 76 is coupled to the sub-torsion shaft 56 via the clutch mechanism 60. The clutch mechanism 60 is similar to those described in Japanese Patent Application Publication No. 2012-144123 (JP 2012-144123 A), Japanese Patent Application Publication No.

2013-1313 (JP 2013-001313 A), Japanese Patent Application Publication No. 2013-249030 (JP 2013-249030 A), and the like, and is known, so the detailed description is omitted.

The switching mechanism 62 is arranged at the other side (left side in FIG. 2) of the spool 48 in the axial direction. The switching mechanism 62 includes the lock ring 76, a lock lever 78, a gas generator 80, and a case (not shown) fixed to the leg piece 46B. The lock ring 76 is formed in a ring shape. The lock ring 76 is coaxially arranged with the spool 48. The lock ring 76 accommodates the clutch mechanism 60 inside. The lock ring 76 is rotatably supported by the case. A cutout 76A is provided at the outer peripheral portion of the lock ring 76. The lock lever 78 is engaged with the cutout 76A.

The lock lever 78 is formed in a long shape. The lock lever 78 is arranged outside the outer periphery of the lock ring 76. The lock lever 78 is supported by the case via a spindle 84. The axis of the spindle 84 is set so as to be parallel to the axis of the spool 48. The lock lever 78 is pivotable about the spindle 84 between a first position shown in FIG. 3 and FIG. 4 and a second position shown in FIG. 5. In a state where the lock lever 78 is located in the first position, the lock lever 78 is engaged with (fitted to) the cutout 76A of the lock ring 76, and the lock ring 76 is blocked from rotating in the belt drawing direction (the arrow B direction shown in FIG. 3 to FIG. 5). On the other hand, in a state where the lock lever 78 is located in the second position, the above engagement is released, and the lock ring 76 is allowed to rotate in the drawing direction.

In a state (state shown in FIG. 4) where the lock lever 78 is located in the first position and the pair of pawls 70 of the clutch mechanism 60 are engaged with the lock ring 76, the other end of the sub-torsion shaft 56 in the axial direction is blocked from rotating in the belt drawing direction. As the seatbelt 32 is pulled by the occupant P with an excessive load in this state and the rotational force of the spool 48 in the belt drawing direction based on the pulling force exceeds the sum of the torsion resistance load (deformation resistance load) of the main torsion shaft 54 and the torsion resistance load (deformation resistance load) of the sub-torsion shaft 56, the main torsion shaft 54 and the sub-torsion shaft 56 torsionally deform. Thus, in comparison with the case where only the main torsion shaft 54 torsionally deforms, the FL load that acts on the seatbelt 32 increases. On the other hand, in a state where the lock lever 78 is located in the second position, the other end of the sub-torsion shaft 56 in the axial direction is allowed to rotate in the belt drawing direction. In this state, the sub-torsion shaft 56 does not torsionally deform, so the FL load decreases.

Figure 6:
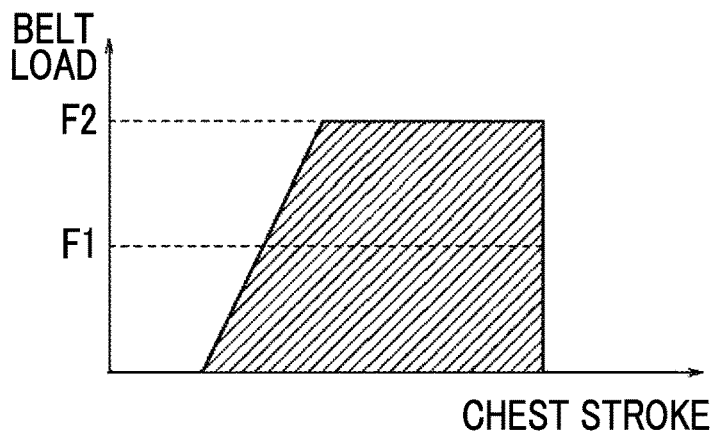
FIG. 6 is a graph that shows the relationship between a belt load (force limiter load) and a stroke of occupant's chest in the case where the variable force limiter mechanism is in a high-load mode.
Figure 7:
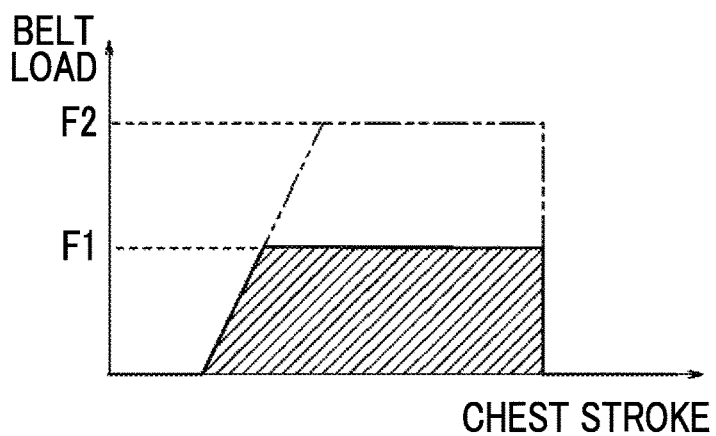
FIG. 7 is a graph that shows the relationship between a belt load and a stroke of occupant's chest in the case where the variable force limiter mechanism is in a low-load mode.

That is, when the lock lever 78 is pivoted between the first position and the second position, the mode of the FL load is changed (switched) in two levels between a high-load mode and a low-load mode. The high-load mode is a mode in which the FL load (belt load) is a high load F2 (maximum load) as shown in FIG. 6. The low-load mode is a mode in which the FL load (belt load) is a low load F1 (minimum load) as shown in FIG. 7. A state where the lock lever 78 is located in the first position is defined as the high-load mode, and a state where the lock lever 78 is located in the second position is defined as the low-load mode. FIG. 6 shows the relationship between a belt load and a chest stroke (a forward stroke of the chest with respect to the vehicle) of the occupant P in the high-load mode. FIG. 7 shows the relationship between a belt load and a chest stroke of the occupant P in the low-load mode.

The lock lever 78 is urged to the first position by a torsional coil spring 86 attached to the spindle 84, and is held in the first position during normal times. For this reason, during normal times (including a state where the ignition switch of the vehicle V1 is off), the mode of the FL load is set to the high-load mode.

On one side (right side in FIG. 3 to FIG. 5) of the lock lever 78 in the pivotal direction, the gas generator 80 is arranged. The gas generator 80 is fixed to the above-described case in a state where a piston 80A is oriented toward the lock lever 78. When the gas generator 80 is energized, gas forming agent is ignited to burn, and generates high-pressure gas. The piston 80A of the gas generator 80 projects toward the lock lever 78 under the pressure of the gas, and the lock lever 78 is pivoted from the first position to the second position. That is, the gas generator 80 is configured to switch the mode of the FL load from the high-load mode to the low-load mode (switch the FL load from the high load F2 to the low load F1.

Configuration of Control Unit 90

Figure 8:
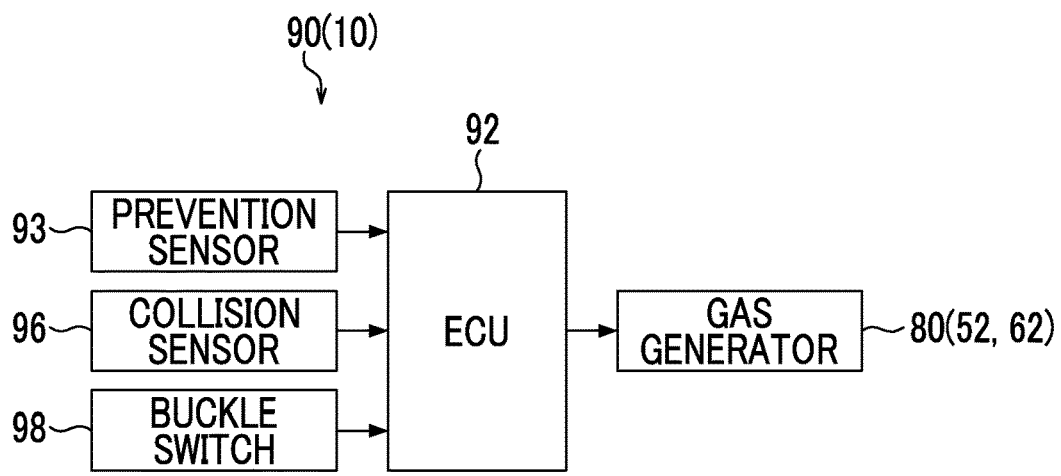
FIG. 8 is a block diagram that shows the configuration of a control unit of the variable force limiter control system for a vehicle according to the first embodiment of the disclosure.

As shown in FIG. 8, the control unit 90 includes an electronic control unit (ECU) 92 as a control unit. The ECU 92 is, for example, installed on the floor of the vehicle under a center console. The above-described gas generator 80, the gas generating device (not shown) of the driver seat airbag device 18 and a gas generating device (not shown) of the pretensioner mechanism are electrically connected to the ECU 92. A prevention sensor 93, a collision sensor 96 and a buckle switch 98 are electrically connected to the ECU 92. The prevention sensor 93 serves as a collision prediction sensor. The collision sensor 96 serves as an acceleration sensor.

Figure 9:
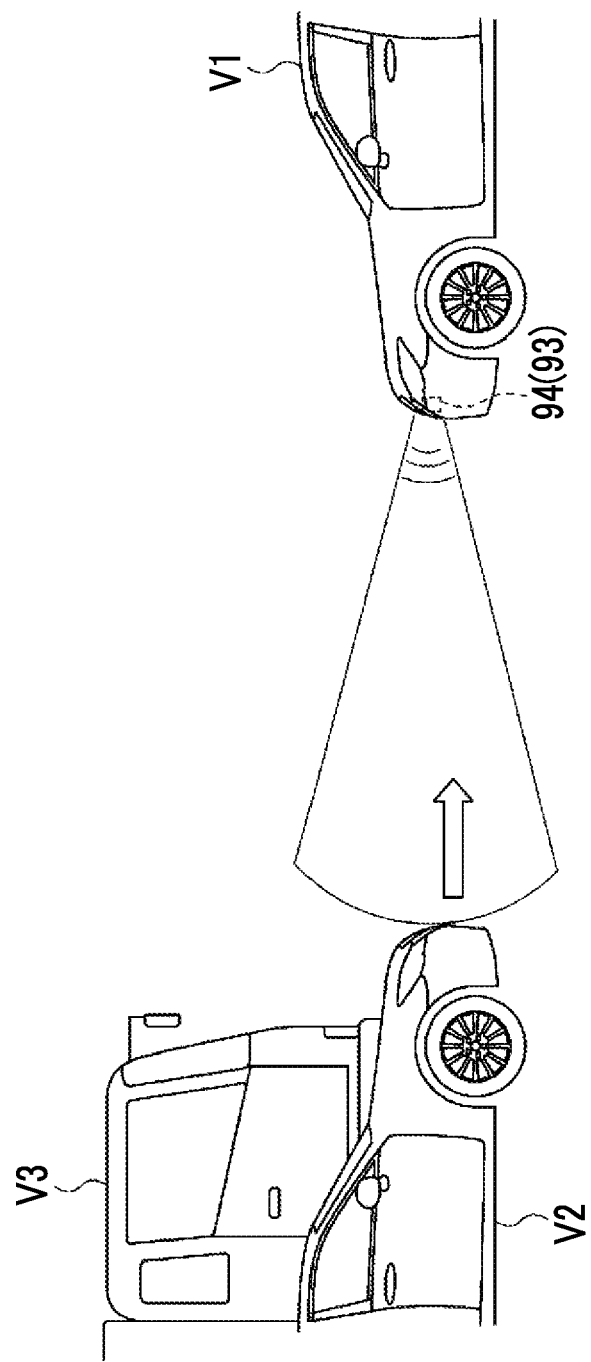
FIG. 9 is a side view that shows a situation before the vehicle according to the first embodiment of the disclosure collides with a collision object.

The prevention sensor 93 is constituted of a millimeter wave radar 94 shown in FIG. 9 in the present embodiment. The millimeter wave radar 94 corresponds to a relative speed sensor in the aspect of the disclosure. The millimeter wave radar 94 is mounted at the front end of the vehicle V1. The millimeter wave radar 94 is configured to, before the vehicle V1 collides with a collision object (here, a vehicle V2 or V3 shown in FIG. 9), detect a relative speed Vr of the vehicle V1 with respect to the collision object and output a signal corresponding to the detected relative speed to the ECU 92. The relative speed sensor is not limited to the millimeter wave radar. The relative speed sensor may be a laser radar, a stereo camera, or the like.

The collision sensor 96 is constituted of a pair of right and left front satellite sensors (not shown) and a floor G sensor (not shown). The pair of right and left front satellite sensors are installed at right and left front side members or a radiator support at the front of the vehicle V1. The floor G sensor is installed on the floor of the vehicle V1 under the center console. Each of the right and left front satellite sensors and the floor G sensor is an acceleration sensor. Each of the right and left front satellite sensors and the floor G sensor detects the acceleration of the vehicle V1 in the event of a frontal collision of the vehicle V1, and outputs a signal corresponding to the detected acceleration to the ECU 92. The above-described frontal collision includes not only a symmetric collision (such as a head-on collision and a full-wrap frontal collision) but also an asymmetric collision such as oblique collision and a minimal wrap collision.

The buckle switch 98 is provided in the buckle 38. The buckle switch 98 is configured to output an on signal in a state where the tongue plate 36 is coupled to the buckle 38, that is, a state where an occupant is wearing the seatbelt 32.

The ECU 92 executes a control program stored in the ROM in a state where the ignition switch of the vehicle V1 is turned on and the on signal is output from the buckle switch 98. With this control program, the ECU 92 predicts a severity ΔV of a collision of the vehicle V1 before the collision on the basis of the relative speed Vr of the vehicle V1 with respect to a collision object, detected by the millimeter wave radar 94 (prevention sensor 93). The ECU 92 controls switching of the mode of the FL load (determines the necessity of switching of the mode) on the basis of both the predicted severity (predicted ΔV) and the acceleration G detected by the collision sensor 96 in the initial stage of the collision of the vehicle V1.

Figure 10:
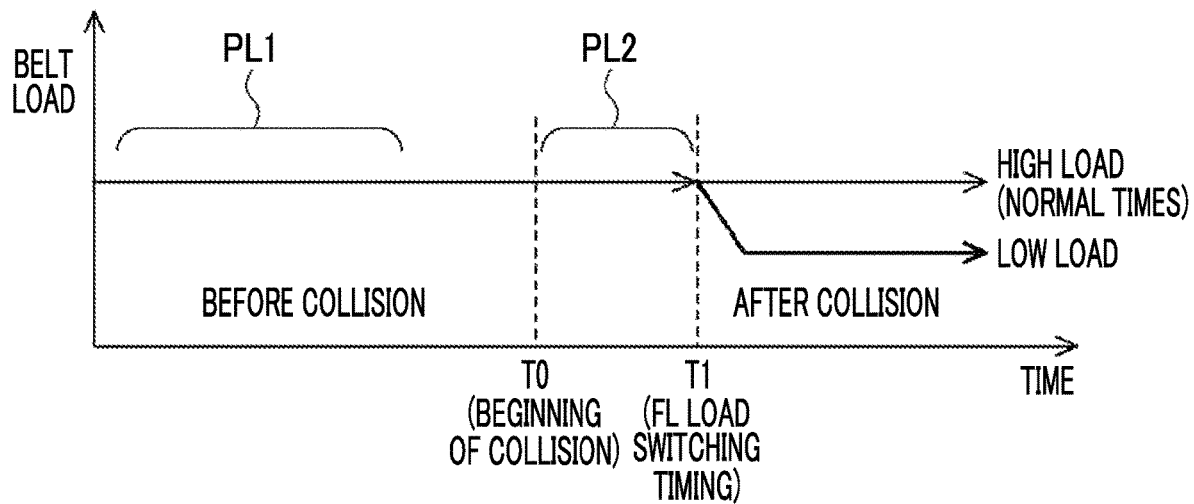
FIG. 10 is a graph that shows the relationship between a time before and after the vehicle according to the first embodiment of the disclosure collides with a collision object and a belt load.
Figure 11:
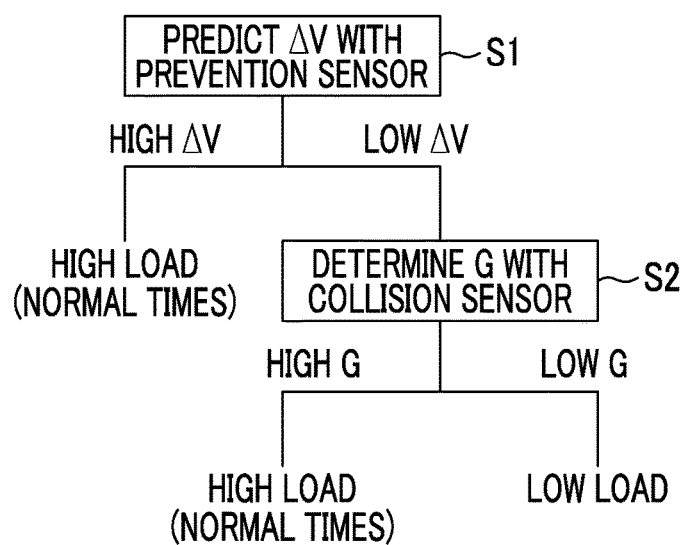
FIG. 11 is a flowchart that shows the control procedure of the variable force limiter control system for a vehicle according to the first embodiment of the disclosure.

Specifically, the ECU 92 predicts the severity ΔV of a collision on the basis of the relative speed Vr detected by the millimeter wave radar 94 in a certain period PL1 (see FIG. 10) before the vehicle V1 collides with a collision object (see step S1 of FIG. 11). When the predicted ΔV is higher than or equal to a preset first threshold (high ΔV), the ECU 92 does not activate the gas generator 80 of the variable FL mechanism 52, and keeps the mode of the FL load in the high-load mode (does not switch the mode of the FL load to the low-load mode). In the present embodiment, the ECU 92 predicts the predicted ΔV as ΔV=Yr. That is, in the present embodiment, when the relative speed Vr is higher than or equal to a preset speed, the ECU 92 is configured not to switch the mode of the FL load to the low-load mode.

When the predicted ΔV is lower than the first threshold (low ΔV), the ECU 92 compares the acceleration G detected by the collision sensor 96 in a certain period PL2 (see FIG. 10) in the initial stage of the collision with a preset second threshold (see step S2 of FIG. 11). When the detected acceleration G is higher than or equal to the second threshold (high G), the ECU 92 does not activate the gas generator 80 of the variable FL mechanism 52, and keeps the mode of the FL load in the high-load mode. On the other hand, when the detected acceleration G is lower than the second threshold (low G), the ECU 92 is configured to activate the gas generator 80 of the variable FL mechanism 52 and switch the mode of the FL load to the low-load mode.

Figure 12:
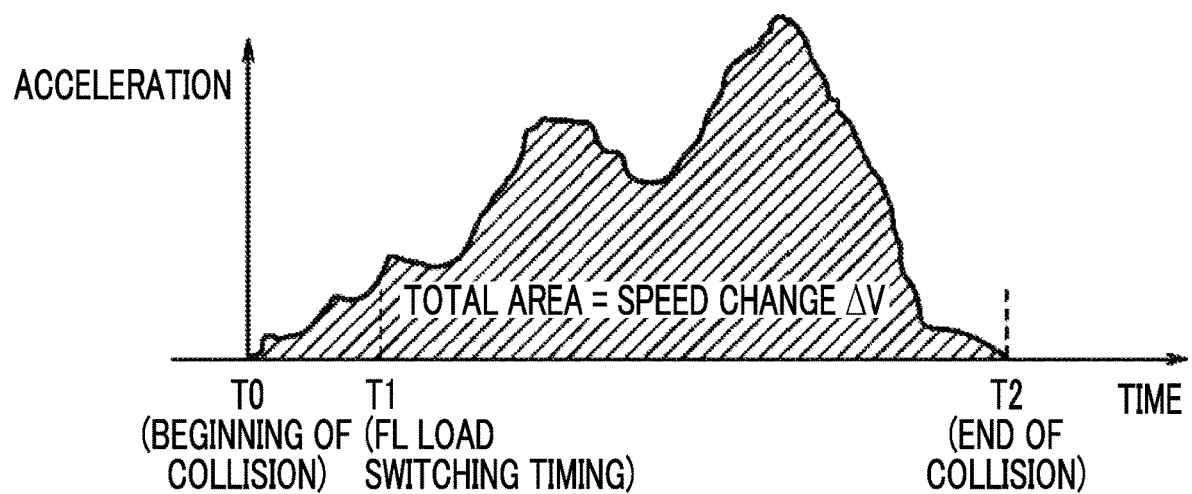
FIG. 12 is a graph that shows the relationship between a time before and after the vehicle according to the first embodiment of the disclosure collides with a collision object and an acceleration detected by a collision sensor.
Figure 13:
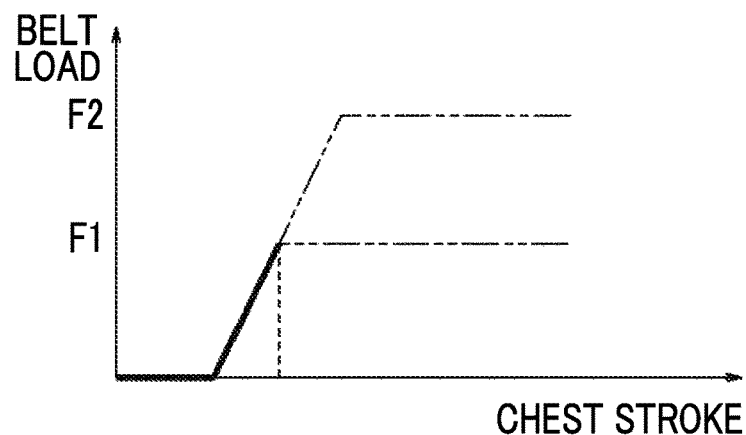
FIG. 13 is a graph for illustrating the switching timing of a force limiter load in the variable force limiter control system for a vehicle according to the first embodiment of the disclosure and corresponds to FIG. 6 and FIG. 7.

In the present embodiment, the initial stage of a collision is a period after the time when a collision of the vehicle V1 with a collision object has begun (time T0 in FIG. 10 and FIG. 12) and before the time when the FL load (belt load) that acts on the seatbelt 32 reaches the low load F1 as shown in FIG. 13 (time T1 in FIG. 10 and FIG. 12). In the present embodiment, the timing at which the ECU 92 switches the mode of the FL load to the low-load mode (FL load switching timing) is set to time T1 in FIG. 10 and FIG. 12.

When the ECU 92 has detected a frontal collision of the vehicle on the basis of an output from the collision sensor 96, the ECU 92 is configured to activate the gas generating device of the driver seat airbag device 18 and the gas generating device of the pretensioner mechanism at the time after time T0 and before time T1. Thus, the airbag 20 inflates and deploys from the instrument panel 14 forward of the occupant P, and the seatbelt 32 is rapidly taken up by the retractor 42 to remove the slack of the seatbelt 32. Since a load from the occupant P that inertially moves due to the impact of a frontal collision acts on the seatbelt 32, the variable FL mechanism 52 operates, the seatbelt 32 is drawn from the retractor 42, and the occupant P inertially moves toward the airbag 20 while receiving the FL load from the seatbelt 32 (see the occupant P indicated by the alternate long and two-short dashes line in FIG. 1). Thus, the seatbelt 32 and the airbag 20 cooperate to restrain the occupant P, and the impact on the occupant P is absorbed.

Operation and Advantageous Effects

Next, the operation and advantageous effects of the present embodiment will be described.

In the above-configured variable force limiter control system 10 for a vehicle, the variable FL mechanism 52 is able to switch the mode of the FL load, which acts on the seatbelt 32 in the event of a collision of the vehicle V1, from the high-load mode to the low-load mode. The millimeter wave radar 94 that constitutes the prevention sensor 93 detects the relative speed Vr before a collision of the vehicle V1 with a collision object. The collision sensor 96 detects the acceleration of the vehicle V1. The ECU 92 predicts the severity ΔV of the collision on the basis of the relative speed Vr detected by the millimeter wave radar 94, and controls switching of the mode of the FL load (determines the necessity of switching of the mode) on the basis of both the predicted ΔV and the acceleration G detected by the collision sensor 96 in the initial stage of the collision of the vehicle V1.

Thus, for example, in comparison with the case where the ECU 92 determines the necessity on the basis of only any one of the predicted ΔV and the detected acceleration G, it is possible to increase redundancy. As a result, it is possible to accurately determine the necessity, so it is possible to prevent or reduce erroneous switching of the mode of the FL load. In addition, the acceleration G detected by the collision sensor 96 in the initial stage of a collision of the vehicle V1 is used, so it is possible to switch the mode of the FL load at appropriate timing.

In order to accurately obtain the severity ΔV of a collision, it is necessary to integrate an acceleration detected by the collision sensor 96 in a period from collision beginning time T0 to collision end time T2 shown in FIG. 12. That is, the total area of the hatched portion in FIG. 12 is obtained as the severity (a change in the speed of the vehicle V1) ΔV of a collision. For this reason, as in the case of the seatbelt retractor described in the column of Description of Related Art, when the severity ΔV of a collision is determined on the basis of a signal detected by the acceleration sensor (which corresponds to the collision sensor 96 according to the present embodiment), it is not possible to accurately determine the severity ΔV of the collision before the end of the collision, so it is difficult to switch the mode of the FL load at appropriate timing.

As a solution to the above problem, for example, it is conceivable to predict the severity ΔV of a collision on the basis of the acceleration G detected by the collision sensor 96 in the initial stage of the collision and control switching of the mode of the FL load on the basis of the predicted severity. However, the variable FL mechanism 52 that is operated after a collision is generally of an explosive type, so the mode of the FL load is allowed to be switched only once. For this reason, even when a prediction is found to be wrong after switching of the mode, it is not possible to switch the mode again. For this reason, in predicting the severity ΔV of a collision, it is desirable to increase redundancy as in the case of the present embodiment. Thus, it is possible to prevent or effectively reduce unnecessary operation of the variable FL mechanism 52.

In the present embodiment, the ECU 92 keeps the mode of the FL load in the high-load mode when the relative speed detected by the millimeter wave radar 94 (prevention sensor 93), that is, the relative speed Vr of the vehicle V1 with respect to a collision object, is higher than or equal to the preset speed (in the event of a high-speed collision). That is, when the mode of the FL load is switched to the low-load mode in the event of a high-speed collision, the risk that the head, or the like, of the occupant P collides with the forward steering wheel 16, or the like, increases. However, in the present embodiment, since the mode of the FL load is kept in the high-load mode, it is possible to avoid the risk.

On the other hand, when the relative speed Vr of the vehicle V1 with respect to a collision object is lower than the preset speed (in the event of a middle or low-speed collision), the energy of the occupant P is small, and the maximum forward stroke of the occupant P with respect to the vehicle V1 also reduces, so the ECU 92 switches the mode of the FL load to the low-load mode. Thus, it is possible to reduce the load that the chest (ribs), and the like, of the occupant P receives from the seatbelt 32, so it is favorable from the viewpoint of, particularly, protecting the chests of elderly people.

Next, other embodiments of the disclosure will be described. Like reference numerals denote basically similar components and operations to those of the first embodiment, and the description thereof is omitted.

Second Embodiment

Figure 14:
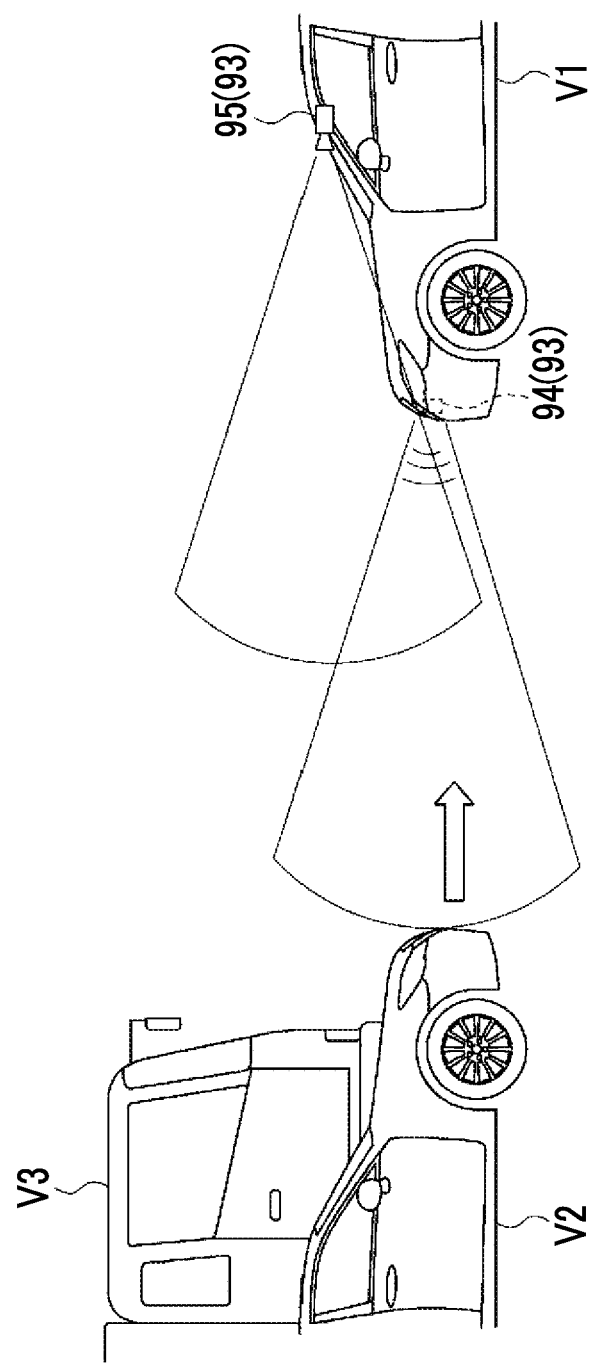
FIG. 14 is a side view that shows a situation before a vehicle according to a second embodiment of the disclosure collides with a collision object.

FIG. 14 shows a side view of part of the vehicle V1 to which a variable force limiter control system for a vehicle according to a second embodiment of the disclosure is applied. In this embodiment, the prevention sensor 93 is constituted of the millimeter wave radar 94 and a stereo camera 95. The millimeter wave radar 94 is a relative speed sensor. The stereo camera 95 is a type detection sensor. The stereo camera 95 is able to detect the type (size, model, and the like) of a collision object (here, a standard-sized car V2 or a full-sized car V3 shown in FIG. 14). The type detection sensor is not limited to the stereo camera 95. The type detection sensor may be a combination of a monocular camera and a laser radar, an inter-vehicle communication device, or the like. The collision object is not limited to a vehicle, such as the standard-sized car V2 and the full-sized car V3. The collision object may be a building, or the like.

Before the vehicle V1 collides with a collision object, the ECU 92 detects the relative speed Vr of the vehicle V1 with respect to the collision object on the basis of an output from the millimeter wave radar 94, and detects the type (size, model, and the like) of the collision object on the basis of an output from the stereo camera 95. The ECU 92 estimates the mass m of the collision object on the basis of the type of the collision object, detected by the stereo camera 95. The ECU 92 predicts the severity $\Delta V$ of the collision on the basis of both the estimated mass m and the relative speed Vr detected by the millimeter wave radar 94. In this case, the ECU 92 is configured to predict a predicted $\Delta V$ as $\Delta V=Vr \times m/(m+M)$ on the basis of the momentum conservation law. M denotes the mass of the vehicle V1. In this embodiment, the remaining configuration other than the above is similar to that of the first embodiment.

In this embodiment, the ECU 92 predicts the severity $\Delta V$ of a collision on the basis of both the relative speed Vr as described above and the estimated mass m of the collision object. Thus, it is possible to increase the accuracy of the predicted $\Delta V$.

Third Embodiment

Figure 15:
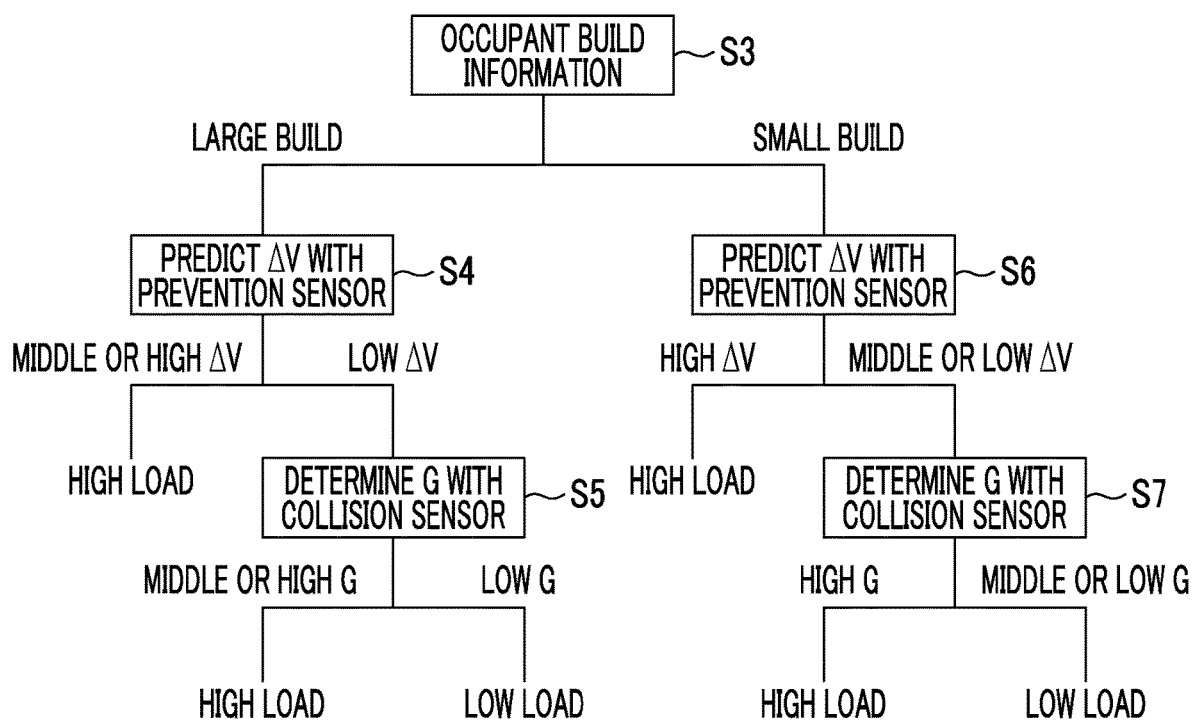
FIG. 15 is a flowchart that shows the control procedure of a variable force limiter control system for a vehicle according to a third embodiment of the disclosure.
Figure 16:
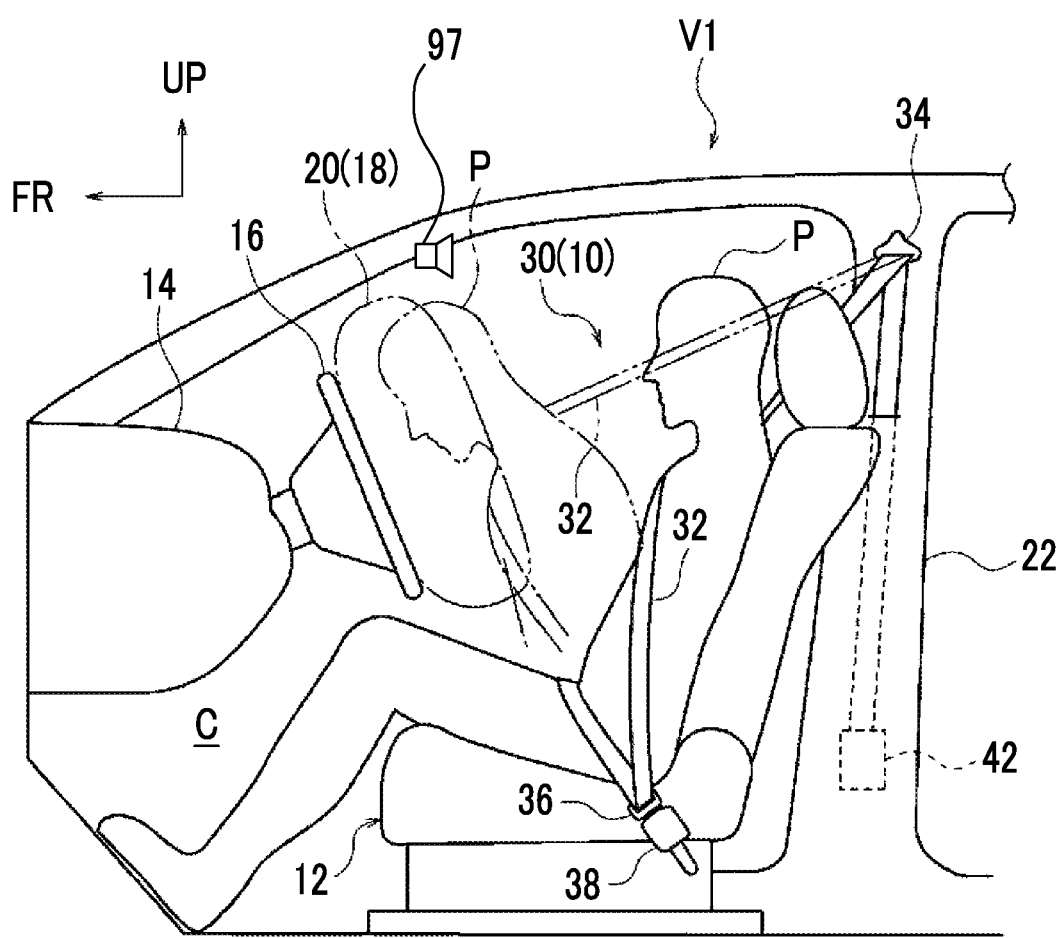
FIG. 16 is a side view when the front part of a cabin of a vehicle to which a variable force limiter control system for a vehicle according to a third embodiment of the disclosure is applied is viewed from a vehicle left side.

FIG. 15 is a flowchart that shows the control procedure of a variable force limiter control system for a vehicle according to a third embodiment of the disclosure. In this embodiment, the variable force limiter control system for a vehicle includes a car interior camera 97 that captures the occupant P as a build sensor (shown in FIG. 16) that detects the build of the occupant P. Instead of the car interior camera 97, the build sensor may include at least one of a seat weight sensor that detects a seated load of the occupant P on the vehicle seat 12, a seat slide sensor that detects the longitudinal slide position of the vehicle seat 12, and a belt drawn amount sensor that detects the amount by which the seatbelt 32 is drawn from the retractor 42. The build sensor is electrically connected to the ECU 92 (not shown in FIG. 15). The build sensor outputs a signal corresponding to the detected build of the occupant P to the ECU 92.

The ECU 92 predicts the maximum forward stroke of the occupant P with respect to the vehicle V1 in the event of a collision in the case where the mode of the FL load is the low-load mode on the basis of both the build detected by the build sensor and the predicted $\Delta V$, and determines whether there is a possibility that the face, or the like, of the occupant P collides (secondary collision) with a vehicle interior component located forward of the occupant P (here, the steering wheel 16 shown in FIG. 1). When the ECU 92 determines that there is the possibility, the ECU 92 is configured to keep the mode of the FL load in the high-load mode (not to switch the mode of the FL load to the low-load mode).

Specifically, in a state where the on signal is output from the buckle switch 98, the ECU 92 determines whether the occupant P has a large build or a small build on the basis of the build detected by the build sensor (see step S3 of FIG. 15). When it is determined that the occupant P has a large build, the process proceeds to step S4 of FIG. 15. In step S4, the ECU 92 compares the predicted $\Delta V$ predicted by using the prevention sensor 93 with a preset third threshold. When the predicted $\Delta V$ is higher than or equal to the third threshold (intermediate $\Delta V$ or high $\Delta V$), the ECU 92 determines that the maximum forward stroke is a stroke that causes the secondary collision, and keeps the mode of the FL load in the high-load mode without activating the gas generator 80 of the variable FL mechanism 52.

On the other hand, when the predicted $\Delta V$ is lower than the third threshold (low $\Delta V$), the process proceeds to step S5 of FIG. 15. In step S5, the ECU 92 compares the acceleration G detected by the collision sensor 96 in the initial stage of the collision with a preset fourth threshold. When the detected acceleration G is higher than or equal to the fourth threshold (intermediate G or high G), the ECU 92 keeps the mode of the FL load in the high-load mode without activating the gas generator 80 of the variable FL mechanism 52. On the other hand, when the detected acceleration G is lower than the fourth threshold (low G), the ECU 92 is configured to switch the mode of the FL load to the low-load mode by activating the gas generator 80 of the variable FL mechanism 52.

On the other hand, when it is determined in step S3 that the occupant P has a small build, the process proceeds to step S6 of FIG. 15. In step S6, the ECU 92 compares the predicted $\Delta V$ predicted by using the prevention sensor 93 with a preset fifth threshold. When the predicted $\Delta V$ is higher than or equal to the fifth threshold (high $\Delta V$), the ECU 92 determines that the maximum forward stroke is a stroke that causes the secondary collision, and keeps the mode of the FL load in the high-load mode (does not switch the mode of the FL load to the low-load mode) without activating the gas generator 80 of the variable FL mechanism 52.

On the other hand, when the predicted $\Delta V$ is lower than the fifth threshold (intermediate $\Delta V$ or low $\Delta V$), the process proceeds to step S7 of FIG. 15. In step S7, the ECU 92 compares the acceleration G detected by the collision sensor 96 in the initial stage of the collision with a preset sixth threshold. When the detected acceleration G is higher than or equal to the sixth threshold (high G), the ECU 92 keeps the mode of the FL load in the high-load mode without activating the gas generator 80 of the variable FL mechanism 52. On the other hand, when the detected acceleration G is lower than the sixth threshold (intermediate G or low G), the ECU 92 is configured to switch the mode of the FL load to the low-load mode by activating the gas generator 80 of the variable FL mechanism 52. In this embodiment, the remaining configuration other than the above is similar to that of the first embodiment.

In this embodiment, when the ECU 92 determines that there is a possibility that the occupant P secondarily collides with a vehicle interior component, such as the steering wheel 16, in the case of the low-load mode on the basis of the build detected by the build sensor and the predicted ΔV, the ECU 92 keeps the mode of the FL load in the high-load mode. Thus, it is possible to prevent or effectively reduce the above-described secondary collision.

Supplemental Explanation of Embodiments

In each of the embodiments, the variable FL mechanism 52 (variable force limiter mechanism) is configured to be able to switch the FL load between high load and low load in two levels; however, the aspect of the disclosure is not limited to this configuration. The configuration of the variable force limiter mechanism may be modified as needed. For example, a variable force limiter mechanism may be configured to be able to steplessly switch the FL load in the range from a high load to a low load. For example, a variable force limiter mechanism may be configured to be able to switch the FL load among a high load, an intermediate load and a low load in three levels.

In each of the embodiments, the retractor 42 of the driver seat seatbelt device 30 includes the variable FL mechanism 52; however, the aspect of the disclosure is not limited to this configuration. A variable force limiter mechanism may be provided in a retractor of a front passenger seat seatbelt device or may be provided in a retractor of a rear seat seatbelt device.

Other than the above, the disclosure may be implemented in various forms without departing from the scope of the disclosure. Of course, the scope of the disclosure is not limited to the above-described embodiments.

What is claimed is:

1. A variable force limiter control system for a vehicle, the variable force limiter control system comprising:
    a variable force limiter configured to change a force limiter load for a seatbelt in an event of a collision of the vehicle;
    a relative speed sensor configured to detect a relative speed between the vehicle and a collision object before the collision;
    an acceleration sensor configured to detect an acceleration of the vehicle;
    an electronic control unit configured to predict a severity of the collision based on the relative speed and control the force limiter load based on the predicted severity and the acceleration in an initial stage of the collision; and
    a build sensor configured to detect a build of an occupant wearing the seatbelt, wherein
    the variable force limiter is configured to switch a mode of the force limiter load from a high-load mode to a low-load mode,
    the electronic control unit is configured to control switching of the mode of the force limiter load,
    the electronic control unit is configured to predict a maximum forward stroke of the occupant with respect to the vehicle in the event of the collision in a case where the mode of the force limiter load is the low-load mode based on the build of the occupant and the predicted severity, and
    the electronic control unit is configured to, in response to a determination that there is a possibility that the occupant collides with a vehicle interior component located forward of the occupant, keep the mode of the force limiter load in the high-load mode.

2. The variable force limiter control system for the vehicle according to claim 1, further comprising:
    a type detection sensor configured to detect a type of the collision object,
    wherein the electronic control unit is configured to estimate a mass of the collision object based on the type of the collision object, and to predict the severity of the collision based on at least the estimated mass and the relative speed.

3. The variable force limiter control system for the vehicle according to claim 1, wherein
    the electronic control unit is configured to, in response to the relative speed is higher than or equal to a preset speed, keep the mode of the force limiter load in the high-load mode.

4. A variable force limiter control system for a vehicle, the variable force limiter control system comprising:
    a variable force limiter configured to change a force limiter load for a seatbelt in an event of a collision of the vehicle;
    a relative speed sensor configured to detect a relative speed between the vehicle and a collision object before the collision;
    an acceleration sensor configured to detect an acceleration of the vehicle;
    an electronic control unit configured to predict a severity of the collision based on the relative speed and control the force limiter load based on the predicted severity and the acceleration in an initial stage of the collision, wherein
    the variable force limiter is configured to switch a mode of the force limiter load from a high-load mode to a low-load mode,
    the electronic control unit is configured to control switching of the mode of the force limiter load, and
    the electronic control unit is configured to, in response to a determination that there is a possibility that the occupant collides with a vehicle interior component located forward of the occupant, keep the mode of the force limiter load in the high-load mode.

5. A variable force limiter control system for a vehicle, the variable force limiter control system comprising:
    a variable force limiter configured to change a force limiter load for a seatbelt in an event of a collision of the vehicle;
    a relative speed sensor configured to detect a relative speed between the vehicle and a collision object before the collision;
    an acceleration sensor configured to detect an acceleration of the vehicle;
    an electronic control unit configured to predict a severity of the collision based on the relative speed and control the force limiter load based on the predicted severity and the acceleration in an initial stage of the collision; and a build sensor configured to detect a build of an occupant wearing the seatbelt, wherein the variable force limiter is configured to switch a mode of the force limiter load from a high-load mode to a low-load mode, the electronic control unit is configured to control switching of the mode of the force limiter load, and the electronic control unit is configured to predict a maximum forward stroke of the occupant with respect to the vehicle in the event of the collision in a case where the mode of the force limiter load is the low-load mode based on the build of the occupant and the predicted severity.

\* \* \* \* \*